United States Patent
Kuipers

[15] 3,660,648
[45] May 2, 1972

[54] ANGULAR RATE COORDINATE TRANSFORMER

[72] Inventor: Jack Kuipers, Grand Rapids, Mich.

[73] Assignee: Northrop Corporation, Palos Verdes, Calif.

[22] Filed: Oct. 15, 1969

[21] Appl. No.: 866,637

[52] U.S. Cl. ............235/186, 235/150.25, 235/150.27, 235/189
[51] Int. Cl. ............................G06g 7/22, G06g 7/78
[58] Field of Search ............235/150.25, 150.27, 186, 189

[56] References Cited

UNITED STATES PATENTS 3,131,292  4/1964  Tobin ............................235/186

Primary Examiner—Malcolm A. Morrison
Assistant Examiner—R. Stephen Dildine, Jr.
Attorney—Olsen and Stephenson

[57] ABSTRACT

Apparatus for converting signals representing rates of change of the angular position of a body with respect to its own axes to Euler angle rates of change utilizing three resolvers and two feedback paths so as to avoid practical difficulties equivalent to the "gimbal-lock" problem in the gyroscope art.

5 Claims, 12 Drawing Figures

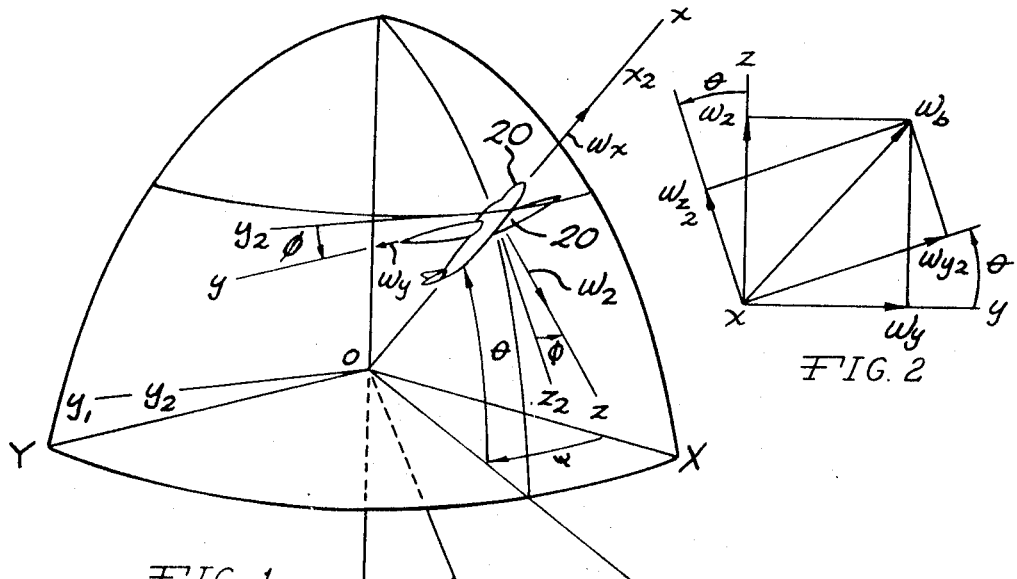
FIG. 1
FIG. 2
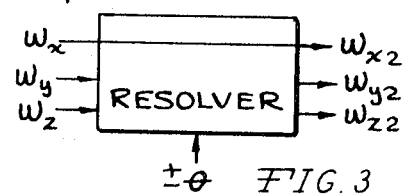
FIG. 3
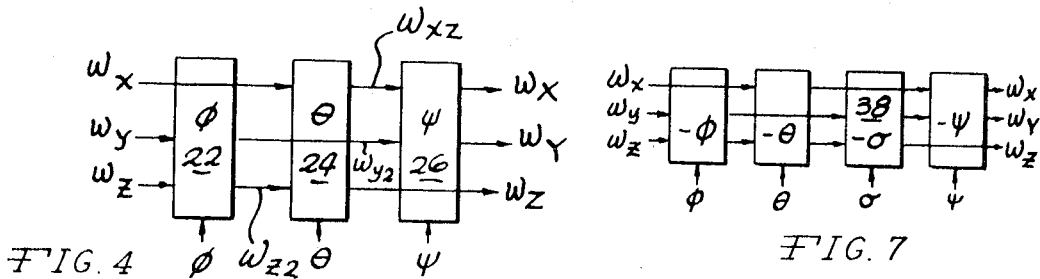
FIG. 4
FIG. 7
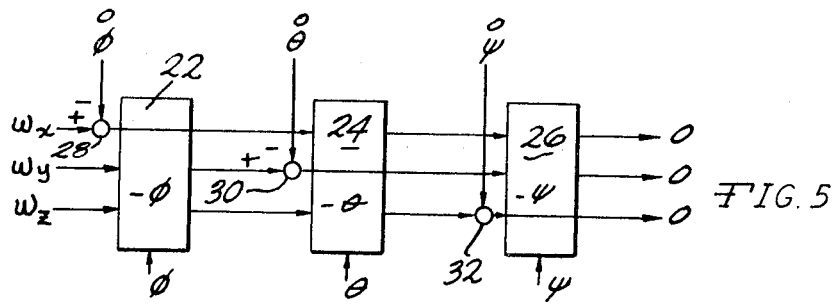
FIG. 5
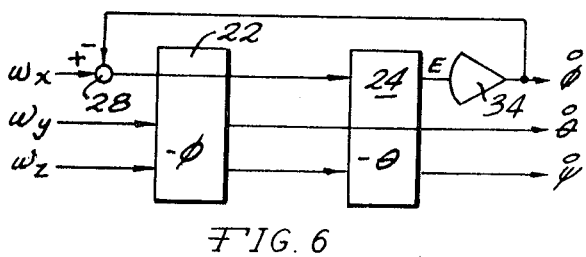
FIG. 6
INVENTOR
JACK KUIPERS
BY
*Olsen and Stephenson*
ATTORNEYS

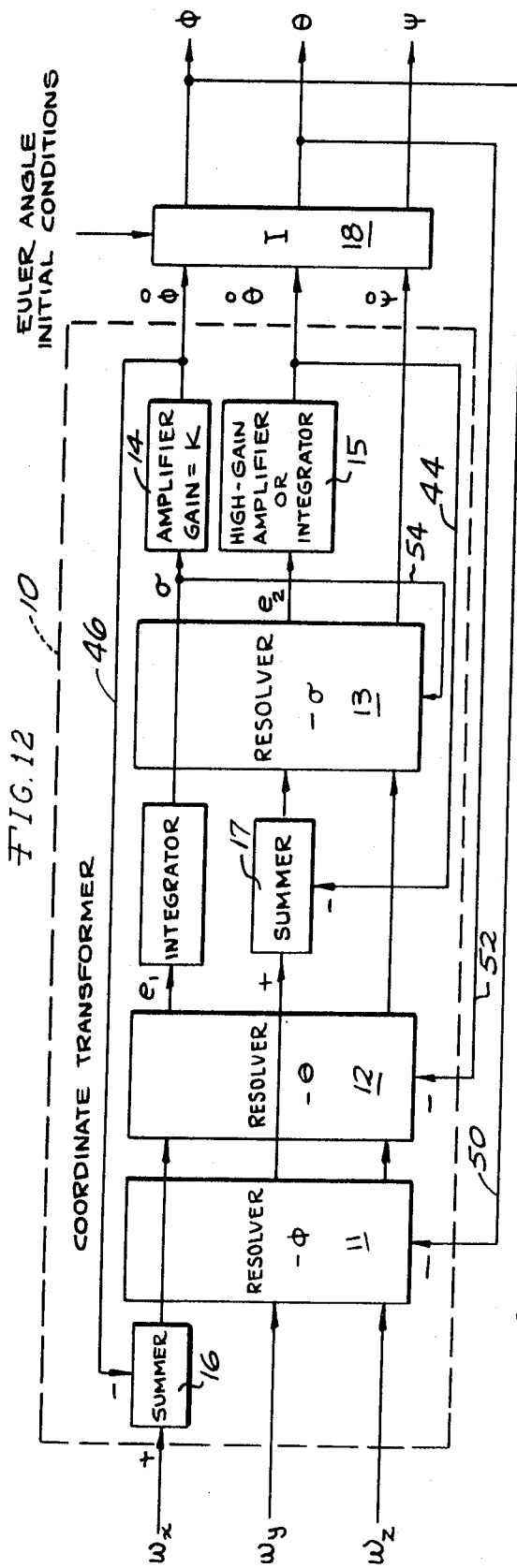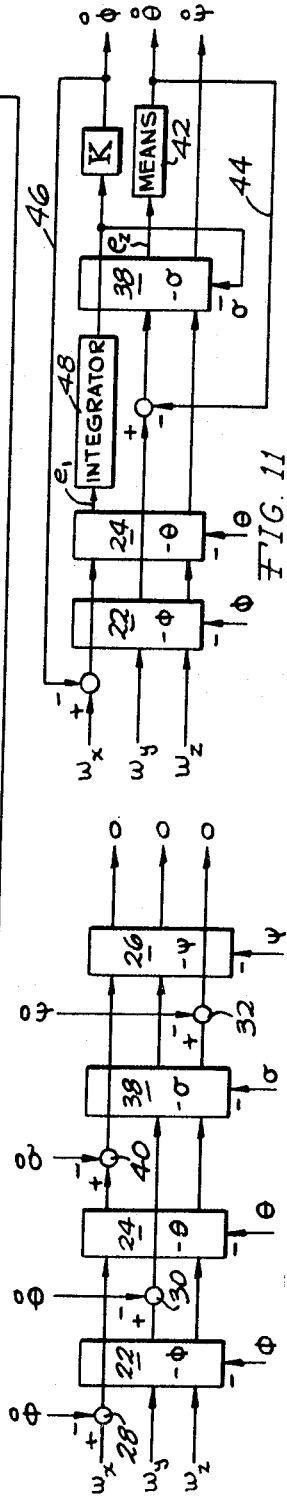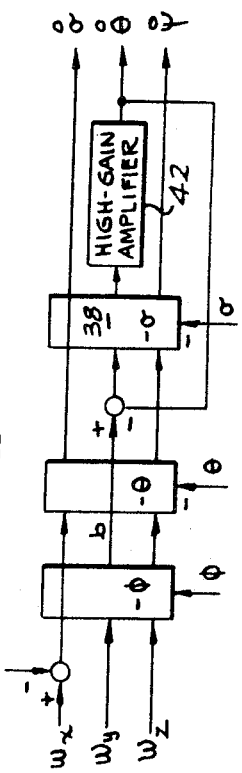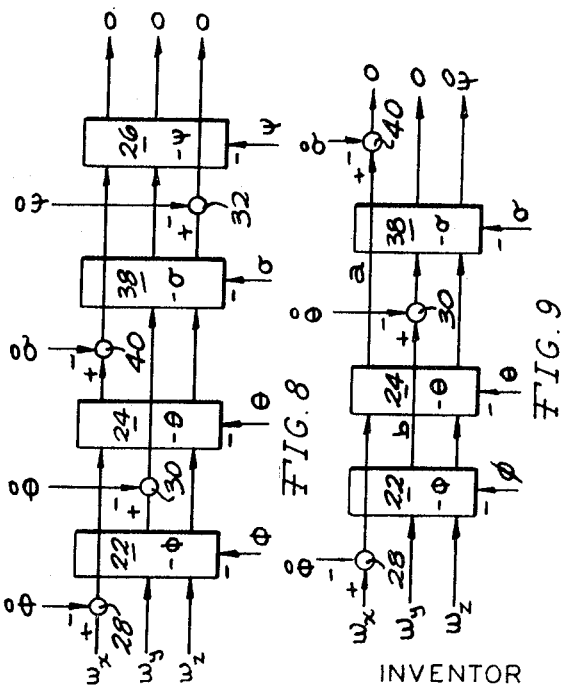

ANGULAR RATE COORDINATE TRANSFORMER

This invention relates generally to apparatus for defining the orientation of a body with respect to fixed axes and more particularly to "no gimbal-lock" apparatus capable of obtaining Euler angle rates of changes for the body. This invention is an improvement on the apparatus shown in copending application Ser. No. 584,919, filed Oct. 6, 1966, now U.S. Pat. no. 3,747,241.

Coordinate transformer apparatus is particularly useful in connection with defining, measuring and controlling the movement of a body in space, such as aircraft. Such a body is continually moving, and this motion is definable with respect to the orthogonal axes of the body, hereinafter referred to as the $x$, $y$ and $z$ axes. The rates of changes of the angular position of the body with respect to these axes can readily be determined by instrumentation on the body. The resultant total angular rate of change of the body can be represented by a vector, and analog signals can be generated which are representative of the vector components with respect to the body axes. However, this information concerning the angular rates of change of the body with respect to the body axes, when integrated to give angles, provides a result which is somewhat meaningless regarding the instantaneous position of the body, since the positions of the body axes are continually changing. The desired information is information representative of the position of the body with respect to three orthogonal axes fixed with respect to inertial space, or any sensible reference frame, hereinafter referred to as the X, Y and Z axes. The orientation of the three orthogonal axes of the body can be specified with respect to some arbitrary reference frame having axes X, Y and Z by three successive angular rotations. These angular rotations are known as Euler angles, the angles employed to specify the orientation of one three axis system with respect to another. Consequently, if a device which can transform body axes angular rate components into Euler angle rate components can be devised, the resulting Euler angle rates can be integrated to determine the instantaneous position of the body. It is therefore desirable to obtain apparatus which is capable of transforming the components of the vector representing the angular rate of change of the body position relative to the body axes into rates of Euler angle change which is reliable under all circumstances. The principal object of this invention, therefore, is to provide improved coordinate transformer apparatus which includes a no gimbal-lock feature.

The improved apparatus of this invention utilizes three resolvers, each of which functions to convert two input components of a given vector defined in one coordinate frame into output components of the same vector defined in another coordinate frame which is rotated with respect to the first coordinate frame. Thus, a resolver is capable of operating on two input components corresponding to two of the three components of the body axes angular rate vector, $w_b$, along the $x$ and $y$ axes to provide output components of $w_b$ along the new axes, rotated by some angle $\theta$ relative to the input $x$ and $y$ axes. Resolvers capable of performing these functions are well known. In the improved apparatus of this invention three resolvers are utilized in conjunction with appropriate feedback arrangements around high gain amplifiers and an integrator so as to provide the desired results and avoid the practical difficulties encountered in the two resolver arrangement shown in the aforementioned application in the circumstance when $\theta$ is 90°. The coordinate transformer of this invention will thus continuously provide the proper output components of Euler angle rates consistent with the motion of the body. This invention thus provides electronic gimballing for a gyroscope with "no gimbal-lock" properties.

Further objects, features and advantages of this invention will become apparent from a consideration of the following description, the appended claims, and the accompanying drawing in which:

FIG. 1 is a diagrammatic representation of a body in space having orthogonal axes designated $x$, $y$ and $z$ and showing the angular orientation or position of the body in terms of Euler angles with respect to fixed axes X, Y and Z;

FIG. 2 is a diagrammatic representation of the resolution of a vector $w_b$ having components $w_y$ and $w_z$ into components $w_{y2}$ and $w_{z2}$;

FIG. 3 is a block diagram representation of the resolution shown in FIG. 2 utilizing a resolver;

FIG. 4 is a block diagram representation of a resolution employing three resolvers;

FIGS. 5–11 are diagrammatic views showing the intermediate steps which explain the "no gimbal-lock" feature in the present invention; and FIG. 12 is a diagrammatic representation of the transformer apparatus of this invention shown supplied with signals representing the components of $w_b$ along the body axes and connected to an integrator, the output of which will continuously represent the angular position of the body with respect to the reference axes.

With reference to the drawing, the coordinate transformer apparatus of this invention, indicated generally by the broken line box 10 in FIG. 12, is illustrated as consisting of three resolvers 11, 12 and 13, a pair of high gain amplifiers 14 and 15, a pair of summers 16 and 17, which are conventional pieces of equipment that function to add electrical or mechanical signals, and integrator apparatus 18. Before explaining the transformer 10 in greater detail, reference is made to FIG. 1 which illustrates a body 20, in this case an airplane, having a longitudinal or roll axis $x$, a lateral or pitch axis $y$, and a yaw axis $z$. The body 20 is illustrated positioned with respect to reference axes X, Y and Z, and the Euler angles $\phi$, $\theta$ and $\psi$, the common designations for bank angle, elevational angle, and heading angle are also illustrated. The position of the $x$, $y$ and $z$ axes relative to the X, Y and Z axes is conventionally defined as follows:

Consider at the outset that the body axes $x$, $y$ and $z$ are coincident with the reference axes X, Y and Z and by introducing three rotations hereinafter described the general orientation of the body 20 will be defined.

First the $x$ and $y$ axes are rotated through the angle $\psi$ about the Z axis, so as to locate the $x$ and $y$ axes at the imaginary positions indicated at $x_1$ and $y_1$ in FIG. 1. The axis $z$ is at this time coincident with Z.

The $x$ and $z$ axes are then rotated about the $y_1$ axis through the angle $\theta$ so that the $x$, $y$ and $z$ axes are now located at $x_2$, $y_2$ and $z_2$, respectively.

Finally, the $y$ and $z$ axes are rotated about the $x_2$ axis through the angle $\phi$ to locate the axes $x$, $y$ and $z$ as shown. The body 20 is shown in the drawing translated from point 0 only for the purpose of drawing clarity. This translation is not important in this invention which deals only with angles.

The above-described sequence is illustrative of 12 rotational sequences that are known and any one of which can be utilized in the apparatus 10 of this invention for obtaining particular Euler angle rates. It is to be understood therefore that this described sequence is illustrative only and that this invention is of a scope to encompass the other 11 sequences as well.

Conventional instruments in the body 20 measure the components of the angular rate of change of the body 20 with respect to the body axes $x$, $y$ and $z$ and these components are represented in FIG. 12 by the designations $w_x$, $w_y$ and $w_z$. However, these vector components are relatively meaningless for orienting the body 20 and controlling its movement, and the coordinate transformer apparatus 10 thus operates to convert this meaningless information into Euler angle rates $\dot{\phi}$, $\dot{\theta}$ and $\dot{\psi}$ which are integrated by the integrator 18 to provide the desired Euler angle information $\phi$, $\theta$ and $\psi$, respectively.

In the apparatus 10, the inputs are identified as $w_x$, and $w_y$ and $w_z$, as shown in FIG. 12. As shown diagrammatically in FIGS. 2 and 3 when vector components $w_y$ and $w_z$ are rotated through Euler angle $\theta$, components $w_{y2}$ and $w_{z2}$ are obtained. Thus:

$$w_{y2} = w_y \cos\theta - w_z \sin\theta$$
$$w_{z2} = w_z \cos\theta \pm w_y \sin\theta$$

As shown in FIG. 4, when three resolvers 22, 24 and 26 are used, resolver 22 rotates components $w_y$ and $w_z$ through Euler angle $\theta$ to obtain intermediate components $w_{y2}$ and $w_{z2}$. Subsequently, resolver 24 rotates components $w_x$ and $w_{x2}$ through Euler angle $\theta$ to obtain components $w_{x2}$ and $w_z$ and resolver 26 rotates components $W_{x2}$ and $w_{y2}$ through Euler angle $\psi$ to obtain components $w_X$ and $w_Y$.

By definition, the transformation shown in FIG. 4 specifies X, Y and Z at a given time. The position of the body 20 is however continuously changing so the angles $\theta$, $\phi$ and $\psi$ are constantly changing. Thus, if at each Euler angle resolver, a summer is interposed to subtract the appropriate Eulerian angular rate component which accounts for the motion of the body 20, the resulting angular rate output of the transformation will be zero. This is illustrated in FIG. 5, wherein the summers are shown at 28, 30 and 32.

As shown in FIG. 5, the resolver 26 is operating on components which are zeros. As a result, the resolver 26 can be eliminated. The transformation which converts body axes angular rates into the corresponding Eulerian angular rates for the sequence of rotations shown in FIG. 5 then simplifies to the arrangement shown in FIG. 6 where the feedback with the high gain amplifier or integrator 34, at the output of the $x$ component is to satisfy the requirement that the output E be zero or essentially zero.

The equations representing the angular rate transformation shown diagrammatically in FIG. 6 are:
$$\dot{\phi} = w_x = (w_y \sin \phi + w_z \cos \phi) \tan \theta$$
$$\dot{\theta} = w_y \cos \phi - w_z \sin \phi$$
$$\dot{\psi} = (w_y \sin \phi + w_z \cos \phi) \sec \theta$$

From these equations it is seen that when $\theta$ approaches ninety degrees while $\phi$ equals zero, $\dot{\phi}$ and $\dot{\psi}$ approach infinity. This, in practical applications, is the gimbal-lock difficulty which the present invention overcomes.

This is accomplished in the present invention by first introducing an additional redundant angular degree of freedom into the transformation shown in FIG. 4. This allows the transient reorientation of the angles without disturbing the fixed orientation of the reference frame. This is illustrated in FIG. 7 where the redundant degree of freedom is represented by an additional resolver 38.

The transformation shown in FIG. 7 is thus identical to the one shown in FIG. 4, whenever the angle $\sigma$ is zero. The objective in FIG. 7 is to allow the necessary transient angular freedom in $\sigma$ to avoid the gimbal-lock difficulty, but to maintain the steady state value of $\sigma$ at zero. In order to facilitate the explanation, summers are used diagrammatically, as in FIG. 5, the additional summer 40 corresponding to the added resolver 38, as shown in FIG. 8. Since the resolver 26 is operating on components which are zeros, it can be eliminated to obtain the three resolver arrangement shown in FIG. 9.

As shown in FIG. 9, the output of the $x$ component indicates that $a - \dot{\sigma} = 0$, so "$a$" must equal $\dot{\sigma}$. Also, if the output of the $y$ component must equal zero, as shown, then the value of $\dot{\theta}$, subtracted from the $y$ component prior to being operated upon by the $\sigma$ resolver, must be correct in order to make the output component equal 0. To accomplish this, the $y$ component is applied to a means such as a high gain amplifier 42 (FIG. 10), and its output is fed back as $\dot{\theta}$. By virtue of the negative feedback arrangement, any significant non-zero residual appearing at the amplifier input will be amplified and thereby readjust $\dot{\theta}$ such that the amplifier input will tend more toward zero. The arrangement then becomes as shown in FIG. 10.

The integral of $\dot{\theta}$ gives $\theta$, for the $\theta$ resolver, and also for one of the desired outputs. The integral of $\dot{\sigma}$ gives $\sigma$ for the resolver 38, but it is not desired as a primary output. It must however, be zero steady-state since only when it is 0 are the other three desired angles $\phi$, $\theta$ and $\psi$ free from transient errors and therefore correspond to the true Euler angles for this particular Euler angle/axis sequence.

If $\dot{\phi} = K\sigma$, where K represents amplifier gain, $\dot{\phi}$ is non-zero only when $\sigma$ is non-zero, which means that transient errors exist only when the body is subjected to angular rotation. The magnitude of these transient errors depends on the value of the amplifier gain K. The implementation of this is accomplished by merely amplifying the $\sigma$ integrator output by an amplifier with gain $K$ and feeding it back to the input of the $x$-channel (negatively), satisfying the input requirement for $\dot{\phi}$ at this point. The result is shown in FIG. 11 wherein two feedback paths 44 and 46 function to satisfy the implicit requirement that $e_1$ and $e_2$ be zero (steady state) or essentially zero. The intermediate output $e_1$ is fed to an integrator 48 whose output is a measure of the $\sigma$ angle and which is therefore used as the angle input to the resolver. The Eulerian angular rate $\dot{\phi}$ is chosen proportional to the angle $\sigma$. The proportionality constant $K$ determines the transient dynamics of the transformation.

The resulting structure of this invention, shown in FIG. 12, thus corresponds to the structure shown in FIG. 11, with the addition of the integrator apparatus 18 for obtaining true Euler angles. The resolvers 11, 12 and 13 in FIG. 12 correspond to the resolvers 22, 24 and 38 shown in FIG. 11 and the lines 50, 52 and 54 in FIG. 12 indicate the signals which determine the angles through which the inputs to the resolvers are rotated.

From the above description, it is seen that the basic function of the resolvers 11, 12 and 13 is to transform the body angular rate vector (body axis components) into Eulerian angular rate components. In principle, only two resolvers are required to make this transformation, but in this invention three resolvers are employed in order to avoid the dynamic errors encountered when $\theta$ is 90°. The third, or redundant, resolver angle is proportional in magnitude to the angular rate of one of the other two resolver angles. If the angular rate of the body is zero, then the angular transformation represented by the third resolver is the identity (zero angle). The third resolver functions to limit the maximum angular rate required in the transformation at the extreme attitudes by introducing short time memory using the third resolver and an integrator. In the sequence described above, the angle $\sigma$ will be proportional to the $\dot{\phi}$ angular rate. Therefore, the dynamics, or the maximum angular rates required by the coordinate transformer of this invention, can be controlled by the gain (rate-to-angle proportionality) of the redundant angular transformation of the third resolver. The function of the feedback paths 44 and 46 are to provide the required computing measure of $\theta$ and $\phi$, respectively, at the appropriate points in the coordinate transformer.

It is to be understood, however, that the resolvers 11, 12 and 13 and the feedback paths 44 and 46 can be arranged other than in the specific arrangement illustrated in FIG. 12 so long as the equations governing the no gimbal-lock coordinate transformation are satisfied. Three resolvers and two feedback paths are essential, but variations in implementation are possible without departing from the scope of the invention. For example, the feedbacks can be derived at different points in the circuit shown in FIG. 12. As a result, any coordinate transformer wherein three resolvers and two feedback paths are combined so that one of the three resolvers provides only a transient nonzero angle transformation, where the non-zero angle is proportional to the angular rate of change of one of the other two resolvers is within the purview of this invention.

What is claimed is:

1. Coordinate transformer apparatus for obtaining Euler angle rates of change with respect to predetermined reference axes from signals representing the component angular rates of change of angular position of a body measured along three orthogonal axes fixed with respect to said body, said apparatus comprising first resolver means receiving two signals representing vector components which in turn represent the angular rates of change of said body about two of said body axes, said first resolver means being continuously set to resolve said signals representing vector components one of which is oriented with respect to said reference axes and the other one of which is an intermediate output component, second and third resolver means connected to each other and to said first resolver means for receiving inputs, said second and third resolver means being set to resolve said inputs into output components, feedback means connected to said second and third resolver means so as to receive said output component therefrom, summing means connected to and providing input for said second and third resolver means, said summing means being supplied with an input signal representing said angular rate of change of said body about said third body axis, said feedback means being connected to and operable to provide a further electrical signal to said summing means which after summing with said input signal to said summing means and resolution in said second resolver means will result in the output component from one of said second and third resolver means being zero or essentially zero.

2. The combination according to claim 1 wherein said feedback means comprises two feedback paths.

3. Coordinate transformer apparatus for obtaining Euler angle rates of change with respect to predetermined reference axes from signals representing the component angular rates of change of position of a body measured along three orthogonal axes fixed with respect to said body, said apparatus comprising three resolvers, each said resolver being capable of providing two output signals representing Euler angular rates of change corresponding to applied input signals representing angular rates of change, feedback means connected from the output to the input sides of two of said three resolvers for modifying input signals to said two of said three resolvers, each said input signal including the sum of the integral of the Euler angle output rates of each of said two resolvers and a separate one of said angular rates of change, and means for providing as an input to the third of said resolvers signals which are a function of the angular rate output of one of said two resolvers, said angular rate output of one of said two resolvers being determined by the angular rate of said body, whereby the input to the third of said resolver is essentially zero when said body is not subjected to an angular rate.

4. In coordinate transformer apparatus for converting first, second and third body angular rate input signals into first, second and third Euler angle output signals respectively, the combination of:
first, second and third resolvers, each said resolver being capable of receiving first and second input signals and a reference signal and producing first and second output signals according to the equations
$$X = X \cos\theta \pm y \sin\theta$$
$$Y = y \cos\theta \pm x \sin\theta$$
where $x$ is the amplitude of a first input signal to each resolver
$y$ is the amplitude of a second input signal to each resolver,
$X$ is the amplitude of a first output signal from each resolver,
$Y$ is the amplitude of a second output signal from each resolver, and
$\theta$ is the amplitude of a reference signal;
first and second summers, each capable of receiving first and second input signals and producing an output signal according to the equation
$$A = B - C$$
where $A$ is a summer output signal amplitude
$B$ is a first summer input signal amplitude, and
$C$ is a second summer input signal amplitude;
an integrator having an input and an output terminal;
two amplifiers each having an input and an output terminal;
means for applying said first and second body angular rate input signals to said first resolver;
means for applying said third body angular rate input signal to said first summer;
means for applying the first output signal from said first resolver and the output of said first summer as input signals to said second resolver;
means for applying the second output signal from said first resolver as an input signal to said second summer;
means for applying the first output signal from said second resolver and the output of said second summer as input signals to said third resolver;
means for applying the second output signal from said second resolver as an input signal to said integrator input terminal;
means for applying the signal from the output terminal of said integrator as an input signal to said first amplifier;
means for applying the signal from the output terminal of said first amplifier as a second input signal to said first summer;
means for applying the output signal from said second amplifier, as a second input signal to said second summer;
means for applying the signal from the output terminal of said integrator as the reference signal to said third resolver;
means for applying the second output signal from said third resolver as an input signal to the input terminal of said second amplifier, whereby said first output signal from said third resolver, the signal from the output terminal of said second amplifier, and the signal from the output terminal of said first amplifier constitute said first, second and third Euler angle output signals, respectively;
first feedback means for applying said third Euler angle output signal to said first resolver as said reference signal applied thereto; and
second feedback means for applying said second Euler angle output signal to said second resolver as said reference signal applied thereto.

5. Coordinate transformer apparatus comprising:
first, second and third resolvers, each having first and second input terminals, a reference terminal, and first and second output terminals for transforming signals received at said input terminals and said reference terminal into signals at said output terminals according to the equations:
$$X = x \cos\theta + y \sin\theta$$
$$Y = Y \cos\theta - x \sin\theta$$
where $x$ and $y$ are proportional to the amplitudes of signals received respectively and said first and second input terminals,
$\theta$ is proportional to the amplitude of a signal received at said reference terminal, and
$X$ and $Y$ are proportional to the amplitudes of signals produced respectively at said first and second output terminals;
first and second summers, each having first and second input terminals and an output terminal for transforming signals received at said input terminals into a signal at said output terminal according to the equation
$$C = A - B$$
where $A$ and $B$ are proportional to the amplitudes of signals received respectively at said first and second input terminals; and
$C$ is proportional to the amplitude of the signal produced at said output terminal;
first and second amplifiers, each having an input and an output terminals; and
first, second, third and fourth integrators, each having an input and an output terminal;
wherein said resolver, summer, amplifier and integrator terminals are connected in circuit as follows:
said first resolver first output terminal to said second resolver first input terminal;
said first resolver second output terminal to said second resolver first input terminal;
said first summer output terminal to said second resolver second input terminal;
said second resolver second output terminal to said first integrator input terminal;
said second resolver first output terminal to said third resolver first input terminal;
said second summer output terminal to said third resolver second input terminal;
said third resolver first output terminal to said second integrator input terminal;

said third resolver second output terminal to said second amplifier input terminal;

said first integrator output terminal to said first amplifier input terminal and to said third resolver reference terminal;

said first amplifier output terminal to said fourth integrator input terminal and to said first summer second input terminal;

said second amplifier output terminal to said third integrator input terminal and to said second summer second input terminal;

said third integrator output terminal to said second resolver reference terminal; and said fourth integrator output terminal to said first resolver reference terminal.

* * * * *

PO-1050
(5/69)

UNITED STATES PATENT OFFICE
CERTIFICATE OF CORRECTION

Patent No. 3,660,648            Dated May 2, 1972

Inventor(s) Jack Kuipers

It is certified that error appears in the above-identified patent and that said Letters Patent are hereby corrected as shown below:

In the specification:

Column 2, line 14 "changes" should be --change--

" 2, line 69 change "$w_{42}$" to --$w_{z2}$"

" 2, line 71 change " = " to -- $\pm$ -- (second occurrence)

" 2, line 72 change "$w_{22}$" to --$w_{z2}$--

Column 3, line 25 change " = " (second occurrence) to -- + --

" 3, line 55 change "emplifier" to --amplifier--

Column 4, line 4 change "this" to --that--

Signed and sealed this 19th day of September 1972.

(SEAL)
Attest:

EDWARD M. FLETCHER, JR.
Attesting Officer

ROBERT GOTTSCHALK
Commissioner of Patents